US006891552B1

(12) United States Patent
Bush (10) Patent No.: US 6,891,552 B1
(45) Date of Patent: May 10, 2005

(54) SPECIFIABLE USER INTERFACES (75) Inventor: Eric N. Bush, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 09/851,224

(22) Filed: May 8, 2001

(51) Int. Cl.$^7$ .................................................. G09G 5/00
(52) U.S. Cl. ........................ 345/762; 345/744; 345/747; 345/765; 345/767; 709/328
(58) Field of Search ................................. 345/744–745, 345/747, 762, 764, 765, 767, 866; 709/331–332, 328, 337

(56) References Cited

U.S. PATENT DOCUMENTS

| | | | | |
|---|---|---|---|---|
| 5,327,529 | A | * | 7/1994 | Fults et al. .................. 345/762 |
| 5,818,444 | A | * | 10/1998 | Alimpich et al. ........... 345/765 |
| 5,867,157 | A | * | 2/1999 | Goddard et al. ............ 345/762 |
| 5,982,367 | A | * | 11/1999 | Alimpich et al. ........... 345/810 |
| 6,038,395 | A | * | 3/2000 | Chow et al. ................. 717/105 |
| 6,189,012 | B1 | * | 2/2001 | Mital et al. ............. 707/103 R |
| 6,543,046 | B1 | * | 4/2003 | Lunt ........................... 717/105 |
| 2002/0152244 | A1 | | 10/2002 | Dean et al. |

OTHER PUBLICATIONS

Solomon et al., Inside Microsoft Windows 2000 Third Edition, Microsoft Press, 2000, pp. 265–275.
Matson, Michael, "Managing Windows with WMI," Microsoft Corporation, http://msdn.microsoft.com/library/techart/mngwmi.htm, Nov. 1999, pp.1–14.

Agrawal et al., "OdeView: The Graphical Interface to Ode," Proceedings of the 1990 ACM SIGMOD International Conference on Managment of Data, 1990, pp. 34–43.
Kilpatrick et al., "ChaosMON—Application–Specific Monitoring and Display of Performance Information for Parallel and Distributed Systems," Conference Proceedings on ACM/ONR Workshop on Parallel and Distributed Debugging, 1991, pp. 57–67.
Karam, "Visualization Using Timelines," Proceedings of the 1994, International Symposium on Software Testing and Analysis, 1994, pp. 125–137.
Ries et al., "The Paragon Performance Monitoring Environment," Proceedings of the Conference on Supercomputing '93, 1993, pp. 850–859.

* cited by examiner

Primary Examiner—John W. Cabeca
Assistant Examiner—Cuong T. Thai
(74) Attorney, Agent, or Firm—Senniger Powers (57) ABSTRACT

A system and method of displaying data representing an object of a class where the class has one or more attributes and each object has an attribute value associated with each attribute. The invention includes a collection class such that each statistic to be monitored is represented as an object of the class. The invention allows a software application to access the objects in a database. The invention provides a user interface (UI) attribute within the class that allows the user to specify the UI to display the attribute values of each accessed object. Each available UI is customized to a statistic to be monitored. Each available UI has a unique user interface attribute value. The invention supports any number of UIs supplied by the user, an application developer, or a third party.

19 Claims, 7 Drawing Sheets

FIGURE 7

SPECIFIABLE USER INTERFACES

TECHNICAL FIELD

The present invention relates generally to user interfaces and object-oriented programming. In particular, this invention relates to a computerized system and method for displaying data related to an object in a class where the user interface for displaying the data is specified per object.

BACKGROUND OF THE INVENTION

In object-oriented programming, a class is a category that describes a group of more specific items, called objects, that can exist within the class. The typical class is a descriptive tool used in a software application to define a set of attributes, services, or other properties that characterize any object of the class. Each object is an instance of the class. Each object has an attribute value associated with each attribute defined by the class.

For example, one disadvantage of the user interface for conventional software applications that display object-oriented data is that the user interface is not tailored specifically to the data being displayed.

Presently available software applications can monitor statistics related to events and performance of a computer. The statistics are stored in a database and include, for example, processor usage, disk capacity, faults, and diagnostic messages. A user can select specific statistics to monitor in various ways, such as by interfacing with the monitoring application or editing a text file. The monitoring application accesses the database to retrieve data relating to the statistics selected by the user.

Some prior art monitoring applications use multiple classes to represent the statistics to be monitored. With these monitoring applications, however, users have to remember the different names of the classes and the statistics they represent. Other monitoring applications use a single generic class to represent the data. With these monitoring applications, the same user interface displays the data associated with each monitored statistic. For some statistics, this generic display is difficult to understand.

For these reasons, improvements in object-oriented programming are desired for displaying data related to an object in a class.

SUMMARY OF THE INVENTION

The invention meets the above needs and overcomes the deficiencies of the prior art by providing improvements in programming. According to one aspect of the invention, a single, generic, collection class permits each monitored statistic to be represented as an object of the class. The attribute values of each object represent data relating to the statistic including, but not limited to, collected performance information, a description of the statistic, and various flags to indicate the state of the object. The objects are stored in a database. The invention allows a software application to access the objects in the database and display the attribute values of each object with a user interface (UI). The invention provides a UI attribute within the class that allows the user to specify the UI to display the attribute values of each object. Each available UI corresponds to a statistic to be monitored. Each available UI has a unique user interface attribute value. The invention supports any number of UIs supplied by the user, an application developer, or a third party.

Another aspect of the invention eliminates the need for multiple classes to represent the statistics to be monitored. The invention allows each monitored statistic to be represented as an object of a single class. The invention also permits the user to associate a specific UI with a specific statistic to be monitored.

Briefly described, a computerized method of displaying data defines a plurality of attributes of a class of data. The data includes one or more objects wherein each object is an instance of the class. At least one of the attributes represents a user interface. The objects each have a plurality of attribute values corresponding to the attributes of the class. At least one of the attribute values is associated with the user interface attribute of the class. The method also accesses the user interface attribute value of each object and displays the attribute values of the object responsive to the user interface attribute value.

In accordance with another aspect of the invention, a computer-readable medium stores a data structure representing a class that includes one or more objects. Each object is an instance of the class. The computer-readable medium has a first field for storing one or more data attributes representing data and a second field for storing a user interface attribute representing a user interface. Each object has an attribute value associated with each of the attributes. The user interface, as identified by a user interface attribute value of a specific object, displays the attribute values of the specific object.

Another aspect of the invention is directed to a computer-readable medium having computer-executable components for displaying data associated with at least one object of a class. The class has attributes and each object of the class has attribute values associated with the attributes. The computer-executable components include an access component and a display component. The access component accesses a user interface attribute value of each object. The display component displays the attribute values of the object responsive to the user interface attribute value.

In accordance with yet another aspect of the invention, a system for displaying data includes means for defining a plurality of attributes of a class of data. The data includes one or more objects wherein each object is an instance of the class. At least one of said attributes represents a user interface. The objects each have a plurality of attribute values corresponding to the attributes of the class. At least one of the attribute values is associated with the user interface attribute of the class. The system also includes means for accessing a user interface attribute value of each object. The system also includes means for displaying, responsive to the user interface attribute value, the attribute values of the object.

Alternatively, the invention may comprise various other methods and apparatuses.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

The invention generally relates to displaying data. In object-oriented programming, a class is a category that describes a group of more specific items, called objects, that can exist within the class. The class is a descriptive tool used in a software application to define a set of attributes, services, or other properties that characterize any object of the class. Each class has one or more attributes. Each object is an instance of the class and has an attribute value associated with each attribute defined by the class.

The invention includes a collection class such that each statistic to be monitored is represented as an object of the class. The attribute values of each object represent data relating to the statistic including, but not limited to, collected performance information, a description of the statistic, and various flags to indicate the state of the object. The objects are stored in a database maintained by a software application implementing the Web-Based Enterprise Management (WBEM) protocol such as WINDOWS Management Instrumentation (WMI) by Microsoft Corporation. The database stores the objects representing the collected statistics. The WBEM software application is a management mechanism that provides uniform data collection and data management to manage local and remote computer systems. A monitoring application (e.g., an application which monitors various event and performance statistics of one or more computers) interfaces with the database to collect and analyze information for a user. The invention allows the monitoring application to access the objects in the database and display the attribute values of each object with a user interface (UI). Preferably, the invention provides a UI attribute within the class that allows the user to specify the UI to display the attribute values of each object. In one embodiment, each available UI is suited to display data relating to a particular statistic and has a unique user interface attribute value. The invention supports any number of UIs supplied by the user, an application developer, or a third party.

Figure 1:
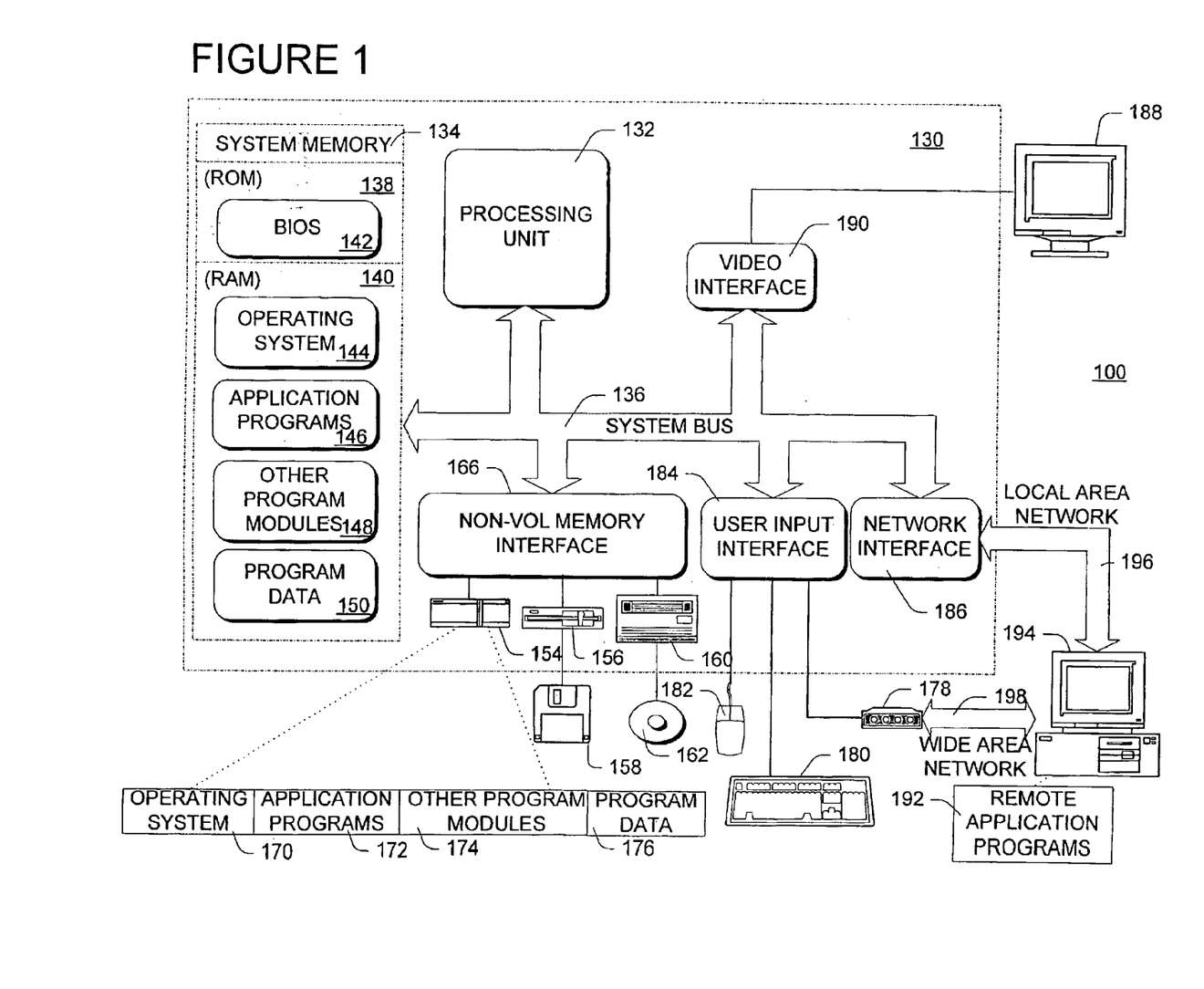
FIG. 1 is a block diagram illustrating one example of a suitable computing system environment on which the invention may be implemented according to a preferred embodiment of the invention.

Referring first to FIG. 1, a block diagram illustrates one example of a suitable computing system environment 100 on which the invention may be implemented. The computing system environment 100 is only one example of a suitable computing or operating environment and is not intended to suggest any limitation as to the scope of use or functionality of the invention. Neither should the computing system environment 100 be interpreted as having any dependency or requirement relating to any one or combination of components illustrated in the exemplary computing system environment 100.

FIG. 1 shows one example of a general purpose computing device in the form of a computer 130. In a preferred embodiment of the invention, a computer such as the computer 130 is suitable for use in FIGS. 2, 3, and 7.

Computer 130 preferably has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 preferably includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 1 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a nonvolatile memory interface, such as interface 166.

The drives or other mass storage devices and their associated computer storage media discussed above and illustrated in FIG. 1, provide storage of computer readable instructions, data structures, program modules and other data for the computer 130. In FIG. 1, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a universal serial bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 1 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Figure 2:
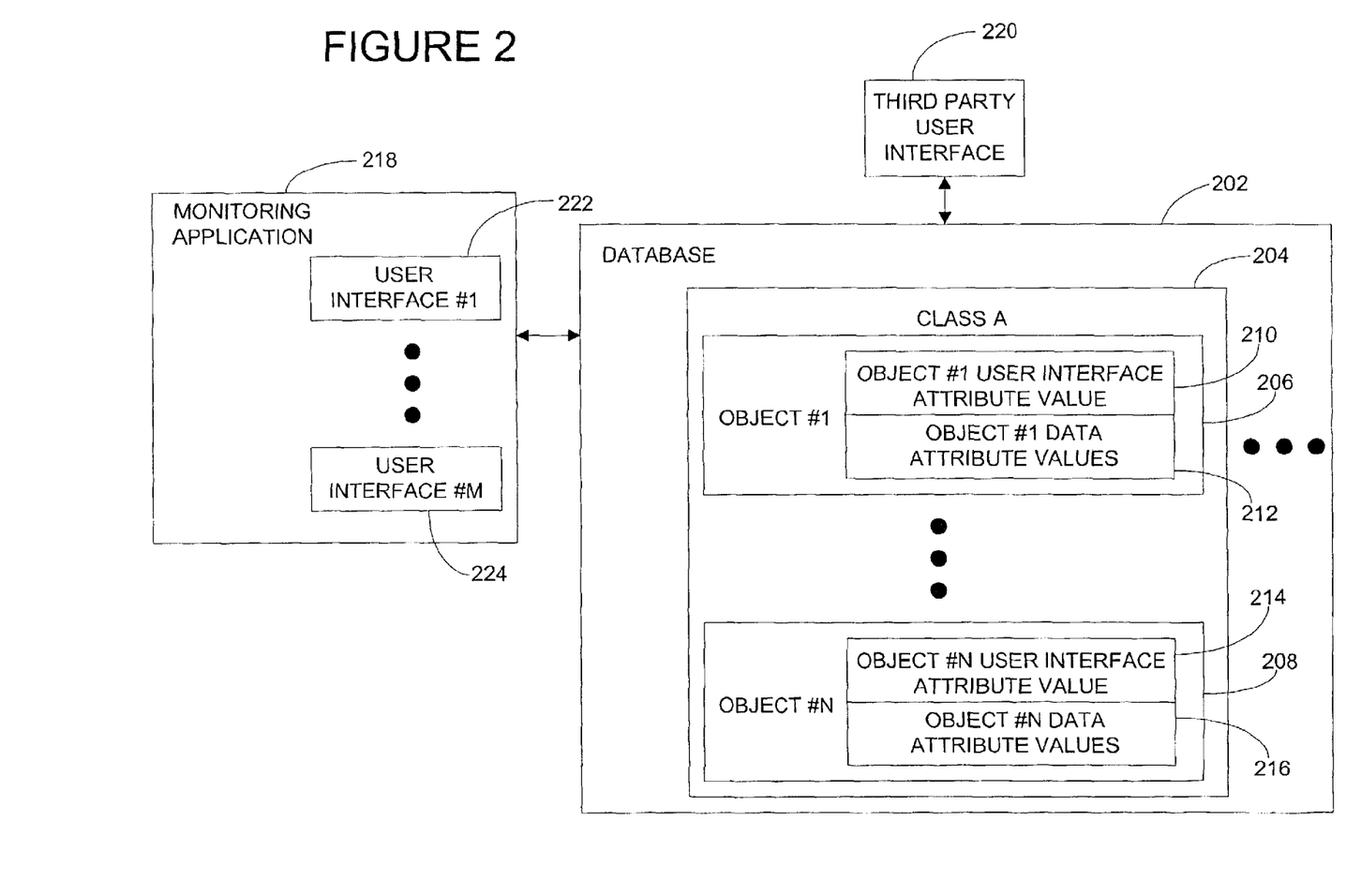
FIG. 2 is a block diagram illustrating communication between a monitoring application and a database of the computing system environment of FIG. 1.

Referring next to FIG. 2, a block diagram illustrates communication between a monitoring application 218 and a database 202. In a preferred embodiment, the monitoring application 218 is one of the application programs 172. The database 202 is a data structure preferably storing data relating to the monitored statistics on a computer-readable medium accessible by computer 130. In one embodiment, the data represents events in computer 130 or indicates performance of one or more applications. The data includes statistics including, but not limited to, hypertext transfer protocol (HTTP) communications, Internet control message protocol (ICMP) communications, services, events, processes, and/or transmission control protocol/Internet protocol (TCP/IP) communications. In this manner, the database 202 organizes and stores statistics specific to the monitored computer, including statistics relating to one or more applications executing on the monitored computer.

In one embodiment, a computer-readable medium such as database 202 stores the data in an object-oriented data structure representing at least one class where each class includes one or more objects. For example, in FIG. 2, the database 202 has one or more classes including Class A 204. Each class may have multiple objects wherein each object is an instance of the class. Each object includes a duplicate of the class data structure. Object #1 206 through Object #N 208 are instances of Class A 204. In this example, there are N instances of Class A 204 stored in the database 202 where N is a positive integer. For example, Class A 204 includes a user interface attribute and at least one data attribute. Each object includes an attribute value corresponding to each attribute of the class. The attribute values of a particular object represent the persistent state of that object.

In FIG. 2, Object #1 206 includes an Object #1 user interface attribute value 210 and at least one Object #1 data attribute value 212. Similarly, Object #N 208 includes an Object #N user interface attribute value 214 and at least one Object #N data attribute value 216. The monitoring application 218 and an optional third party user interface 220 communicate with the database 202. The monitoring application 218 includes a maximum of M user interfaces such as user interface #1 222 through user interface #M 224, where M is a positive integer. The invention supports any number of UIs supplied by the user, an application developer, or a third party. Each user interface is associated with an identifier. In a preferred embodiment, the identifier is a globally unique identifier (GUID). As is well-known to those skilled in the art, the GUID is part of a global universal identification scheme in which only one name is identified with a particular user interface. In the Component Object Model by Microsoft Corporation, the GUID is a unique code represented by a number of digits (e.g., 32 digits). For example, the user interface attribute may be referred to as TypeGUID. Exemplary TypeGUIDs include the strings "03B9B361-2299-11 d3-BE00-000F87A3912" and "E2F3E715-AEE4-454e-AB05D062DBBFAA0F." In an exemplary class structure, the statistics being monitored include performance counter data, component object model data objects, HTTP communications, WMI instances, ping (ICMP) communications, service monitor status, WMI queries, event logs, event queries, processes, and TCP/IP communications.

The monitoring application 218 communicates with the database 202 to retrieve selected objects and display the attribute values of each object with the user interface identified by the user interface attribute value of that object. In this example, the user interface would be user interface #1 222 through user interface #M 224. The user selects the objects to retrieve and display via the monitoring application 218. In addition, the user updates and stores the attribute values of selected objects via the monitoring application 218. The monitoring application 218 permits the user to modify the attribute values of a selected object via the user interface associated with that object. In an alternative embodiment, the user modifies objects and their attribute values by editing a text file accessed by the monitoring application. In one embodiment, the monitoring application 218 is associated with the database 202.

Figure 3:
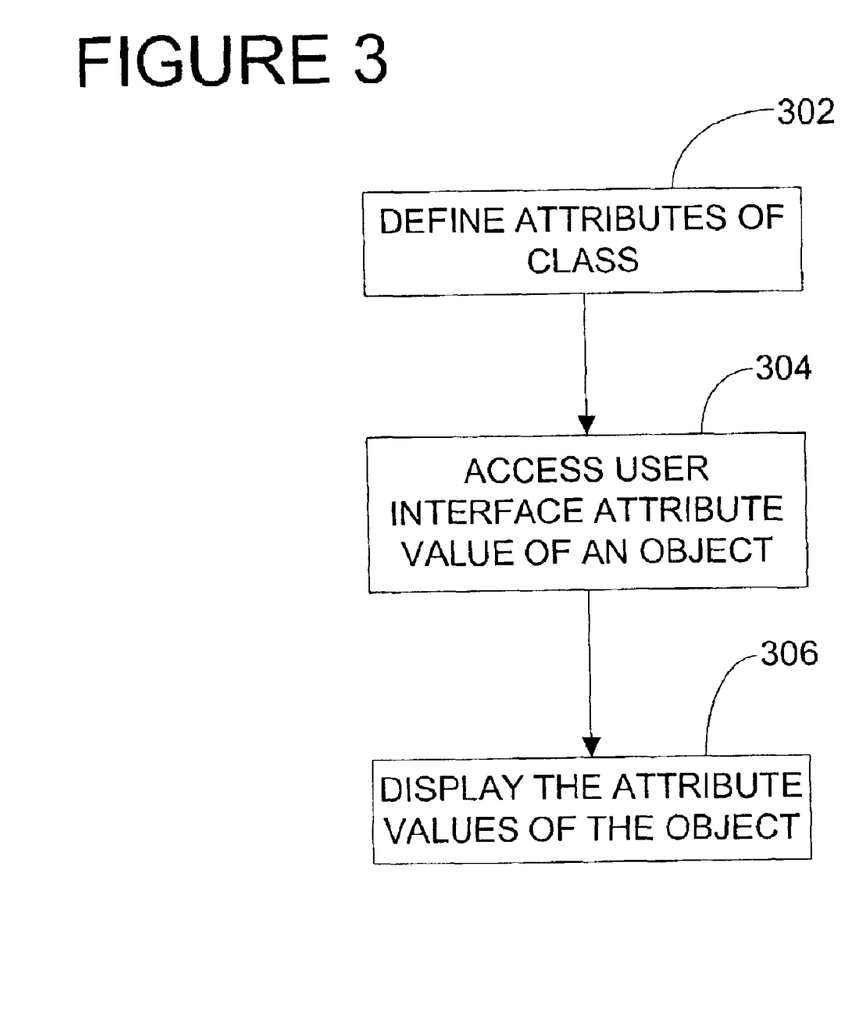
FIG. 3 is an exemplary flow diagram illustrating the display of data associated with an object according to a preferred embodiment of the invention.

Referring next to FIG. 3, a flow chart illustrates the display of data associated with an object. A plurality of attributes of the class of data is defined at 302. The objects each have a plurality of attribute values corresponding to the attributes of the class. The monitoring application (e.g., monitoring application 218 of FIG. 2) accesses at 304 the user interface attribute value of each object. Responsive to the user interface attribute value, the monitoring application displays at 306 the attribute values of the object. In one embodiment, the monitoring application compares the user interface attribute value of each object against a predefined list of values. The predefined list of values identifying specific user interfaces, wherein the specific user interface associated with the user interface attribute value of each object displays the attribute values of each object. For example, the predefined list of values may be a list of TypeGUIDs. If the accessed user interface attribute value does not appear in the list, the monitoring application displays a default user interface (see FIG. 6).

Editing a text file or interacting with a user interface to communicate with the database (e.g., database 202 of FIG. 2) constitute means for defining a plurality of attributes of a class of data. The monitoring application communicating with a database constitutes means for accessing a user interface attribute value of each object. The monitoring application with the appropriate user interface constitutes means for displaying, responsive to the user interface attribute value, the attribute values of the object. Further, the examples described above and examples described elsewhere herein constitute means for defining a plurality of attributes of a class of data, means for accessing a user interface attribute value of each object, and means for displaying, responsive to the user interface attribute value, the attribute values of the object.

Figure 4:
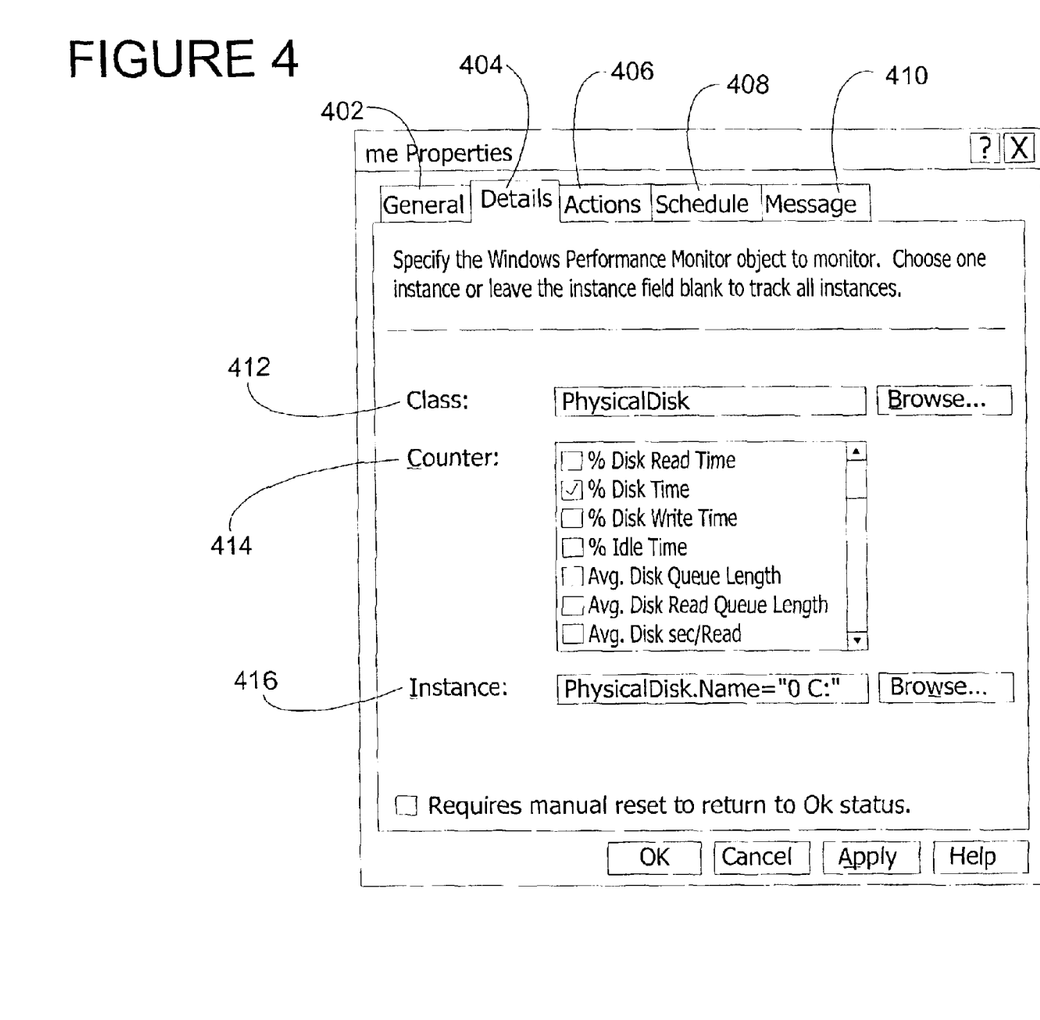
FIG. 4 is an exemplary customized user interface for specifying the collection of monitoring data related to physical disks.

Referring next to FIG. 4, an exemplary embodiment of the invention includes a customized user interface for specifying the collection of monitoring data related to the physical disks of computer 130. When the user interface attribute value of a particular object specifies the user interface of FIG. 4, the user interface of FIG. 4 is used by the monitoring application to display the attribute values of the particular object. A pop-up window includes tabs labeled General 402, Details 404, Actions 406, Schedule 408, and Message 410. The Details tab 404 displays multiple input boxes for inputting a Class 412, a Counter 414, and an Instance 416. In FIG. 4, the Class input box 412 indicates that PhysicalDisk has been input as the class to monitor. The Counter input box 414 displays "% Disk Time" indicating that the user wants to monitor the total time spent accessing the disk. The Instance input box 416 displays "PhysicalDisk.Name='0 C:'" indicating that physical disk C: is to be monitored. The Class input box 412, the Counter input box 414, and the Instance input box 416 display attribute values associated with one object. By editing the input boxes, the user modifies the attribute values of the object whose attribute values are being displayed.

Figure 5:
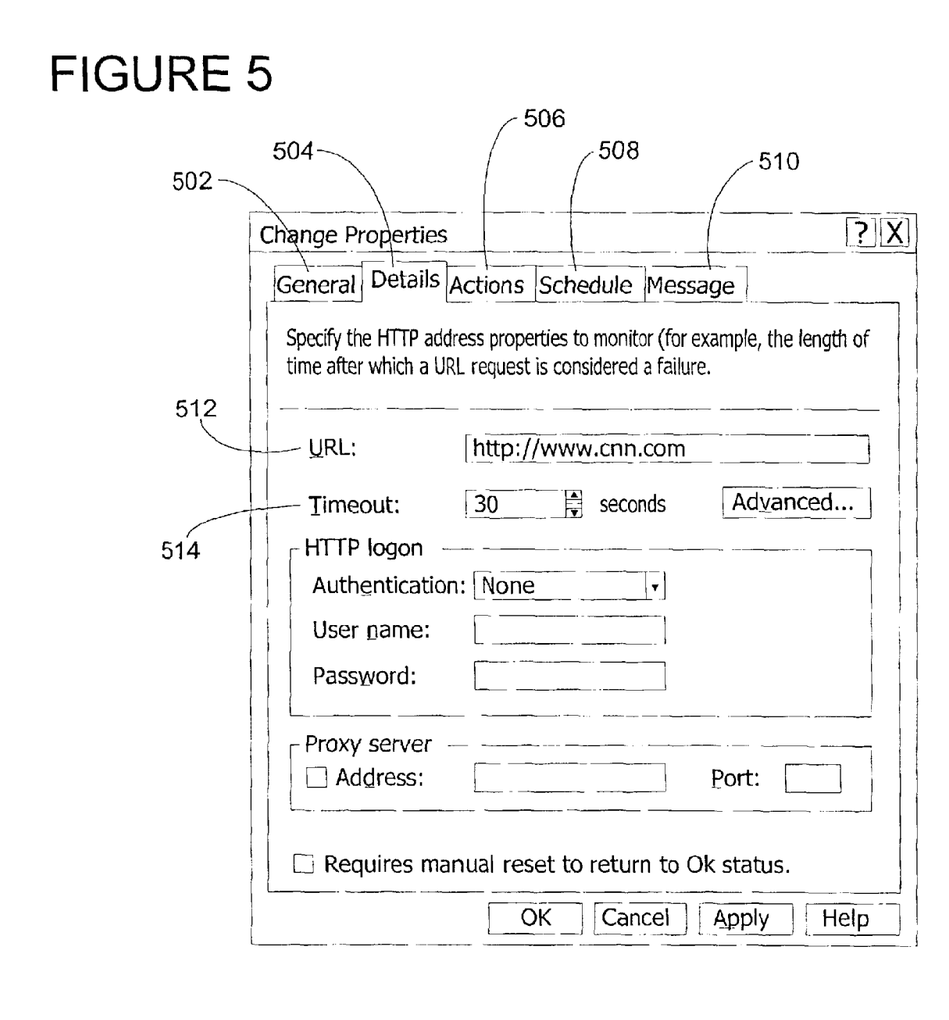
FIG. 5 is an exemplary customized user interface for monitoring hypertext transfer protocol communications.

Referring next to FIG. 5, an exemplary embodiment of the invention includes a customized user interface for monitoring hypertext transfer protocol (HTTP) communications of computer 130. When the user interface attribute value of a particular object specifies the user interface of FIG. 5, the user interface of FIG. 5 is used by the monitoring application to display the attribute values of the particular object. A pop-up window includes tabs labeled General 502, Details 504, Actions 506, Schedule 508, and Message 510. The Details tab 504 displays multiple input boxes for inputting a uniform resource locator (URL) 512 to monitor access to and for inputting a Timeout 514 value in seconds. In FIG. 5, the URL input box 512 indicates that "www.cnn.com" is to be monitored. The Timeout input box 514 indicates that access to the URL is considered a failure if a connection is not made within thirty seconds. By editing the input boxes, the user modifies the attribute values of the object whose attribute values are being displayed.

Figure 6:
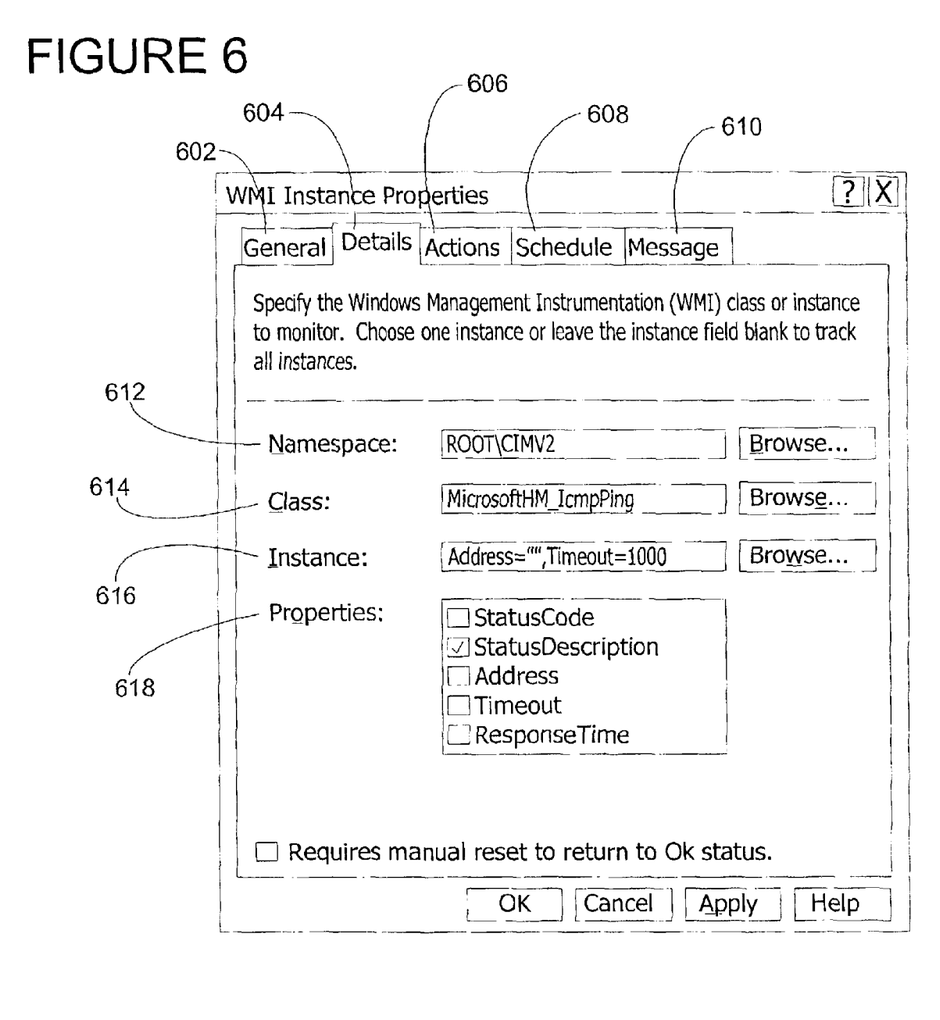
FIG. 6 is an exemplary default user interface for specifying the collection of any type of monitoring data.

Referring next to FIG. 6, an exemplary embodiment of the invention includes a default user interface for specifying the collection of any type of monitoring data. When the user interface attribute value of a particular object is not specified or does match one of values recognized by the monitoring application, the user interface of FIG. 6 is used by the monitoring application to display the attribute values of the particular object. A pop-up window includes tabs labeled General 602, Details 604, Actions 606, Schedule 608, and Message 610. The Details tab 604 displays multiple input boxes for inputting a Namespace 612, a Class 614, an Instance 616, and one or more Properties 618. In FIG. 6, the Namespace input box 612 indicates that the root namespace has been input as the namespace. The Class input box 614 indicates that MicrosoftHM__IcmpPing has been input as the class. The Instance input box 616 indicates that user wishes to collect an instance with any address having a timeout value of 1000. The Properties input box 618 indicates that the StatusDescription attribute will be monitored (as indicated by a checkmark in the box next to the name) and that the StatusCode, Address, Timeout, and ResponseTime attributes will not be monitored. By editing the input boxes, the user modifies the attribute values of the object whose attribute values are being displayed. Those skilled in the art will note that the user interface of FIG. 6 is generic and markedly distinct from the customized user interfaces of FIGS. 4 and 5.

Although the examples of FIGS. 4–6 illustrate user interfaces for use in connection with monitoring software, it is to be understood that aspects of the present invention are applicable to collecting, managing, and displaying any type of data.

Figure 7:
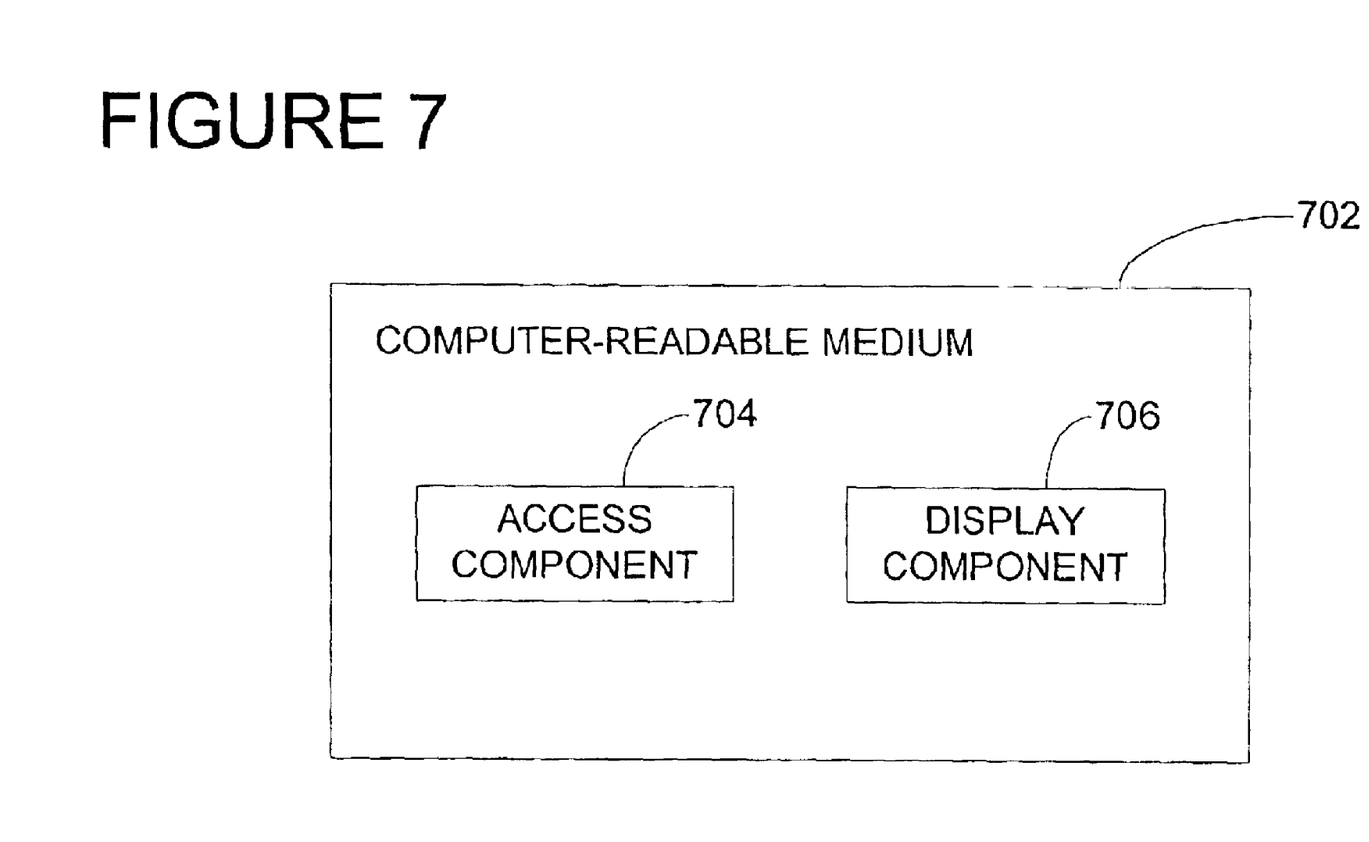
FIG. 7 is a block diagram of an exemplary computer-readable medium on which a preferred embodiment of the invention may be stored.

Referring next to FIG. 7, a block diagram illustrates an exemplary computer-readable medium on which the invention may be stored. The computer readable medium 702 has computer-executable instructions for performing the method of the invention. The computer-readable medium 702 includes an access component 704 and a display component 706. The access component 704 accesses a user interface attribute value of each object. The display component 706 displays the attribute values of the object responsive to the user interface attribute value. The display component includes one or more user interfaces. The user interface attribute value of a particular object specifies one of the user interfaces to display the attribute values of the particular object.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of displaying data comprising:
   defining a plurality of attributes of a class of data, said data including one or more objects, each of said one or more objects being an instance of the class, each of said one or more objects having a plurality of attribute values corresponding to the attributes of the class, at least one of said plurality of attribute values including a user interface attribute value;
   accessing the user interface attribute value of one of the one or more objects;
   comparing the accessed user interface attribute value to a predefined list of attribute values associated with user interfaces, wherein comparing the accessed user interface attribute value identifies a specific user interface; and
   responsive to the accessed user interface attribute value, displaying, in the specific user interface, the plurality of attribute values of the one object.

2. The method of claim 1, wherein the specific user interface identified by the accessed user interface attribute value displays the attribute values.

3. The method of claim 2, further comprising permitting a user to modify the attribute values via the specific user interface.

4. The method of claim 1, wherein displaying includes modifying the attribute values of the object.

5. The method of claim 1, further comprising displaying a default user interface if the user interface attribute value is not in the list.

6. The method of claim 1, wherein each user interface attribute value is a globally unique identifier.

7. The method of claim 1, wherein the data is stored via a monitoring application.

8. The method of claim 1, wherein the data is stored in a database.

9. The method of claim 1, wherein the data represents events in a computer.

10. The method of claim 1, wherein the data indicates performance of one or more application programs.

11. The method of claim 1, wherein the data includes statistics relating to one or more of the following: hypertext transfer protocol communications; Internet control message protocol communications; services; events; processes; and transmission control protocol/Internet protocol communications.

12. The method of claim 1, wherein one or more computer-readable media have computer-executable instructions for performing the method recited in claim 1.

13. A computer-readable medium having stored thereon a data structure representing a class including one or more objects, wherein each of the one or more objects is an instance of the class, said data structure comprising:
   a first field representing one or more data attributes for one of the one or more objects, said first field storing a data attribute value for each of the one or more data attributes; and
   a second field representing a user interface attribute for the one of the one or more objects, said second field storing a user interface attribute value associated with the user interface attribute, said user interface attribute value being compared to a predefined list of attribute values associated with user interfaces, wherein comparing the user interface attribute value identifies a specific user interface, and wherein the specific user interface displays the attribute values of the one of the one or more objects.

14. The computer-readable medium of claim 13, wherein the specific user interface is associated with an identifier.

15. The computer-readable medium of claim 14, wherein the identifier is a globally unique identifier.

16. The computer-readable medium of claim 13, wherein the user interface permits a user to modify the attribute values of the specific object.

17. A system for displaying data comprising:
- means for defining a plurality of attributes of a class of data, said data including one or more objects, each of said one or more objects being an instance of the class, each of said one or more objects having a plurality of attribute values corresponding to the attributes of the class, at least one of said plurality of attribute values including a user interface attribute value;
- means for accessing the user interface attribute value of one of the one or more objects and comparing the accessed user interface attribute value to a predefined list of attribute values associated with user interfaces, wherein comparing the accessed user interface attribute value identifies a specific user interface; and
- means for displaying, responsive to the accessed user interface attribute value, the plurality of attribute values of the one object in the specific user interface.

18. The system of claim 17, wherein the means for displaying includes the specific user interface, wherein the specific user interface is associated with a globally unique identifier.

19. The system of claim 17, wherein the means for accessing includes an application, wherein the application communicates with a database storing the data.

* * * * *